Sept. 2, 1958 A. A. WAGNER 2,850,304
COUPLING HAVING AN INTERNAL EXPANDING SLEEVE
Filed Oct. 20, 1955
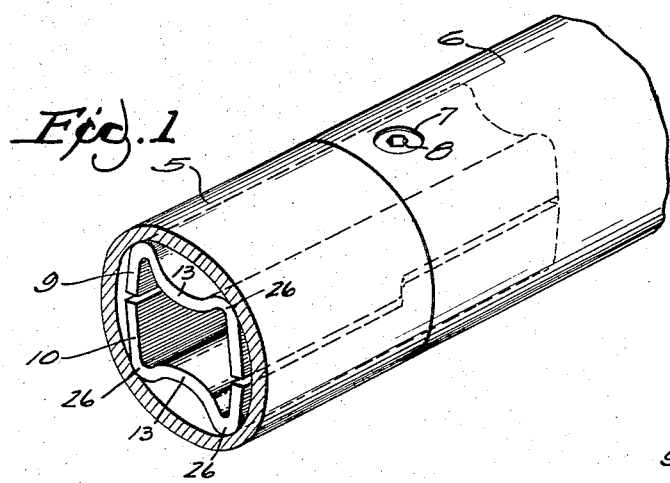
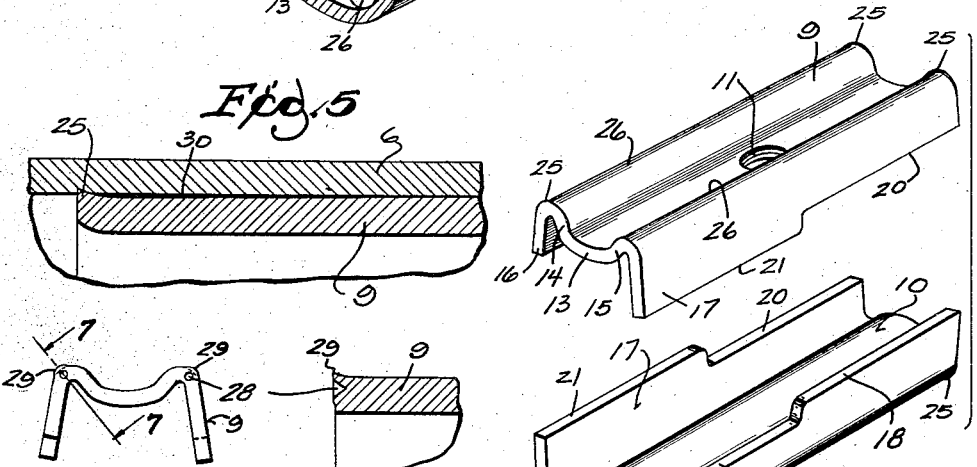
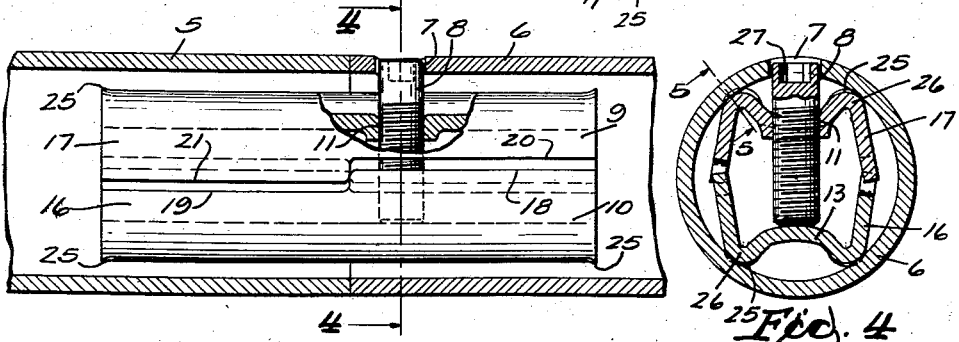
INVENTOR.
ADOLPH A. WAGNER
BY
Wheeler, Wheeler & Wheeler
ATTORNEYS United States Patent Office
2,850,304
Patented Sept. 2, 1958

2,850,304

PIPE COUPLING HAVING AN INTERNAL EXPANDING SLEEVE

Adolph A. Wagner, Milwaukee, Wis., assignor to R & B Wagner Inc., Milwaukee, Wis., a corporation of Wisconsin Application October 20, 1955, Serial No. 541,811

3 Claims. (Cl. 285—397)

This invention relates to a pipe railing splice lock.

In making either permanent or temporary connection between aligned sections of pipe which are not threaded, the lock of the present invention is serviceable. It comprises a form of expanding dowel which is made in two separable sections which are identical save that one is tapped to receive a set screw for engaging the other. The set screw extends into an opening in one of the pipes to be tightened from the outside and to separate the component sections of the splice lock into frictional engagement with the pipes under sufficient pressure so that the pipes are not only held in alignment but are held against axial separation.

The component sections of the device have the form of channels with reversely turned flanges of arcuate form. The set screw engages the bottoms of the respective channels, while the reversely bent flanges engage the inner surfaces of the pipe walls. The flanges are of different arcuate extent at the respective ends of the device to mate with each other in the assembled splice lock to preclude relative axial displacement.

This application is a continuation in part of my copending application Serial No. 419,059, filed March 26, 1954 of the same title, now abandoned.

In the drawings:

Fig. 1 is a view in perspective fragmentarily showing abutting and axially aligned pipe railing sections joined by the splice lock embodying the invention, the ends of which appear in perspective view.

Fig. 2 is a view in perspective showing in mutually separated positions the complementary splice lock elements.

Fig. 3 is a view in side elevation of the assembled splice lock elements as they appear in a pipe as shown in use, the aligned pipes being shown in axial section, and a portion of the splice lock being broken away.

Fig. 4 is a view taken in transverse section on line 4—4 of Fig. 3.

Fig. 5 is an enlarged fragmentary cross section taken along the line 5—5 of Fig. 4.

Fig. 6 is an end elevation of a modified embodiment of the invention.

Fig. 7 is a fragmentary cross section taken along the line 7—7 of Fig. 6.

The two pipes to be united either permanently or temporarily for the purpose of welding are shown at 5 and 6. One of them is provided near its end with an opening at 7 to receive the Allen headed set screw 8.

The splice lock sections 9 and 10 are identical with the exception that one of them has a threaded aperture at 11 to receive the set screw 8. Each splice lock element comprises a shallow channel having a bottom web 13 and side flanges 14 and 15 which are reversely bent upon themselves to form ribbed margins or shoulders 26 from which the flanges are extended at 16 and 17 respectively. The dimensions of the elements are so determined that together the assembled elements will substantially fit the interior of pipes of a given size. The assembly is sufficiently smaller than the pipe in diameter to be freely receivable into pipes, but when the respective elements are separated through the action of set screw 8, the lock is expanded into interior clamping engagement with both pipes.

To preclude relative axial movement of the assembled elements 9 and 10 of the splice lock, each of the extended flanges 16 and 17 has its opposite ends respectively high and low as best shown in Figs. 2 and 3. Thus the flange portion 16 of element 10 has a relatively high margin at 18, at one end of the element and a relatively low margin at 19 at the other end. Similarly, the flange 17 has a relatively low margin at 20, opposite high margin 18 and a relatively high margin at 21, opposite low margin 19. In assembly, the elements are relatively inverted so that the high margin of one mates with the low margin of the other. They are then inserted in the pipes 5 and 6 to span the butt joint between such pipes.

The set screw 8 passes freely through the hole 7 in pipe 6 and is screwed through the threaded aperture 11 of the inverted splice lock element 9 to engage an imperforate inner surface of the web 13 of splice lock element 10. It is not necessary that more than one tapped opening 11 be provided. Consequently, I have shown the element 9 provided with such an opening, while the inverted element 10 has no such opening.

It is to be observed that inasmuch as only one of the pipes 5 and 6 would ordinarily be provided with an aperture at 7 for the set screw the tapped opening 11 of ths split dowel or splice element is desirably put closer to the righthand end of the dowel element 9 than to the lefthand end thereof as viewed in Fig. 3. Continued rotation of set screw 8 forces element 10 downwardly and element 9 upwardly with the result that the butting pipes 5 and 6 are securely locked against lateral displacement in any direction and are frictionally secure against axial displacement.

The device may be left in place in the pipes, if desired, as a substitute for any other means of connection. Ordinarily, pipes will be welded together at the butting joint. Thereupon, the set screw 8 will be removed for use elsewhere. The elements of the splice lock may be removed if one of the ends of one of the pipes is open, or may be left in place. Their construction is specifically designed for manufacture economically in a stamping operation. Hence, the value of the individual elements is not so great as to preclude abandonment in the welded pipe.

The form of the elements in cross section is such as to give them a high degree of strength in proportion to the weight of metal used. It is also advantageous in that the surface contact of the splice lock element with the interior of the pipes is relatively limited and consequently there is minimum interference with the welding operation, if the pipes are to be connected with a weld.

To further interlock the splice elements 9, 10 against displacement with respect to the pipes 5, 6, I desirably form detent projections or burrs 25 on the ends of the shoulders of flanges 14, 15. These interlock with the inner surfaces of the pipes 5, 6 under pressure of set screw 8. The burrs may be formed in the same stamping operation in which the splice lock elements are fabricated.

In the modification of Figs. 6 and 7, I may punch prick the ends of the splice lock elements 9, 10 near the outer surface of each shoulder 14, 15, as at 28, to form detent projections or nibs 29. In function the burrs or nibs 25, 29 score the inner periphery of the pipes 5, 6 to interlock the splice elements 9, 10 therewith under pressure of the screw 8.

As best shown in Fig. 5, there may be a slight clearance 30 between the shoulder of the splice lock and interior wall of the pipe in the vinicity of the burr 25. This is because the burr will not ordinarily seat completely into its scored groove. However, portions of the splice lock shoulder more remote from the burr will be frictionally engaged snugly with the wall of the pipe under pressure of the screw 8.

The set screw 8 is desirably provided with an Allen head socket 27 to receive an Allen head wrench. In this construction, no part of the screw 8 need protrude through aperture 7. Accordingly, the socketed end of screw 8 may be flush with or recessed below the outer periphery of pipe 6 and nothing projects from the smooth surface of the railing.

I claim:

1. An expanding dowel for splicing butting pipes having arcuate interior walls, said dowel comprising a pair of separable elements each of which constitutes a channel having shoulder portions adapted for engagement with the interior walls of the pipes to be spliced, and means threaded to one of said elements and engaged with the other for separating such elements into pressed engagement interiorly with the pipes, said elements being substantially identical in contour, each element comprising a shallow channel having a bottom web and flanges reversely curved back upon themselves, the junction between said web and reversely curved flanges constituting said shoulders, the respective flanges having greater extent adjacent one end of the element than adjacent the other, the lesser extent of one flange being opposite the greater extent of the other flanges of each element, whereby the flange margins are complementary as between the relatively inverted elements to resist axial displacement of the elements with respect to each other.

2. A device of the character described comprising a pair of elements of like cross section assembled in relatively inverted positions, each element having a shallow channel with a transverse bottom web and flanges extending upwardly from said web and reversely curved back upon themselves and extended therefrom beyond said web, the extended flange at one side of the channel having greater extent at one end than at the other and the greater extent of one flange being opposite the lesser extent of the other flange, whereby the margins of said flanges mate complementarily to resist axial displacement when the respective elements are associated in mutually inverted positions, the said elements comprising a split sleeve for reception into butting pipe ends, and a set screw threaded through the web at the bottom of the channel of one element and extending into engagement with the web of the inverted channel of the other element, the set screw being closer to one end of the element into which it is threaded than to the other end of such element.

3. The device of claim 2 in further combination with a pair of aligned pipes one of which has an aperture in which the set screw is freely rotatable, the elements spanning the aligned ends of such pipes to be expanded by the set screw into pressure engagement with the interiors of both pipes.

References Cited in the file of this patent

UNITED STATES PATENTS

| | | |
|---|---|---|
| 962,868 | Traher | June 28, 1910 |
| 1,920,449 | Unke | Aug. 1, 1933 |
| 2,290,430 | Heiser | July 21, 1942 |
| 2,314,509 | Olson | Mar. 23, 1943 |
| 2,588,064 | Webb | Mar. 4, 1952 |
| 2,645,509 | Valenta | July 14, 1953 |
| 2,687,547 | Matter | Aug. 31, 1954 |

FOREIGN PATENTS

| | | |
|---|---|---|
| 485,837 | Canada | Aug. 19, 1952 |